United States Patent

Boisvert, Jr.

[15] 3,659,088

[45] Apr. 25, 1972

[54] METHOD FOR INDICATING MEMORY CHIP FAILURE MODES

[72] Inventor: Conrad J. Boisvert, Jr., Wappingers Falls, N.Y.

[73] Assignee: Cogar Corporation, Wappingers Falls, N.Y.

[22] Filed: Aug. 6, 1970

[21] Appl. No.: 61,674

[52] U.S. Cl. ....................235/153, 324/73 AT

[51] Int. Cl. ....................G01r 31/00

[58] Field of Search ..........340/146.1, 174 ED, 173, 172.5; 324/73, 34 MC; 235/153

[56] References Cited

UNITED STATES PATENTS

| | | | |
|---|---|---|---|
| 3,546,582 | 12/1970 | Barnard et al. | 324/73 |
| 3,562,644 | 2/1971 | De Wolf | 324/73 |
| 3,032,191 | 5/1962 | Clukey | 324/73 X |
| 3,039,604 | 6/1962 | Bickel et al. | 342/73 X |
| 3,323,059 | 5/1967 | Erickson et al. | 324/73 X |
| 3,418,573 | 12/1968 | Alford et al. | 324/73 X |
| 3,478,286 | 11/1969 | Dervan | 235/153 |
| 3,492,572 | 1/1970 | Jones et al. | 324/73 |
| 3,497,685 | 2/1970 | Stafford et al. | 235/153 |

*Primary Examiner*—Charles E. Atkinson
*Attorney*—Harry M. Weiss

[57] ABSTRACT

A machine-practiced method for indicating memory chip failure modes. The individual memory cells on a chip are tested in accordance with standard practice. Each test has associated with it a respective one of the binary numbers 1, 2, 4, 8,.... An "error syndrome" is provided for each cell, and when that cell fails a particular test the respective binary number is added to the error syndrome for the cell. At the end of the sequence a chip map is printed. For each cell there is printed the respective error syndrome; that number identifies a particular group of tests which have been failed by the cell. By analyzing the error syndromes it is possible to identify individual cell failures, group cell failures and gross (total chip) failures. Moreover, the technique of the invention is a valuable diagnostic aid because it enables the causes of many failures to be ascertained.

18 Claims, 2 Drawing Figures

Figure 1:
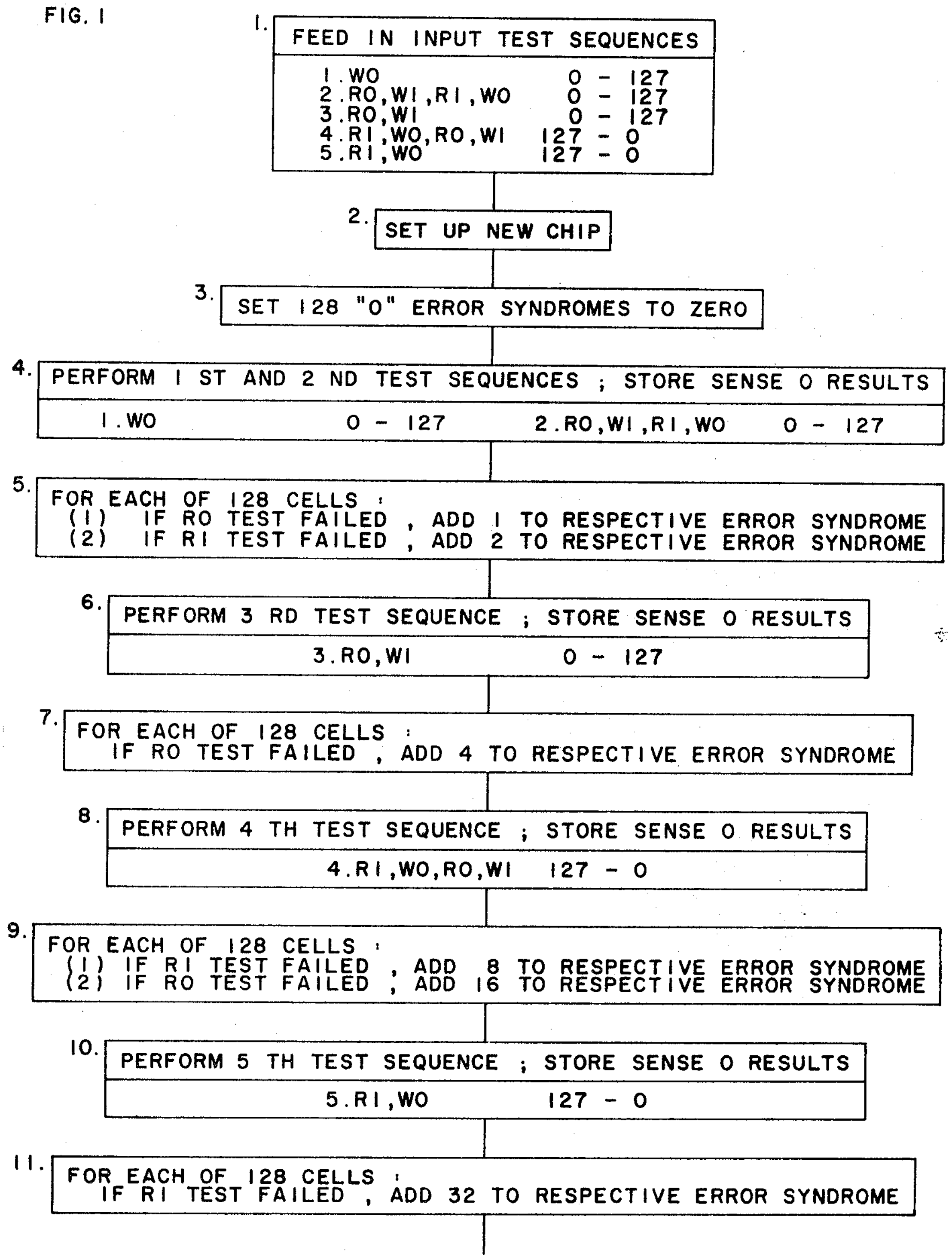

United States Patent
Boisvert, Jr.
[15] 3,659,088
[45] Apr. 25, 1972
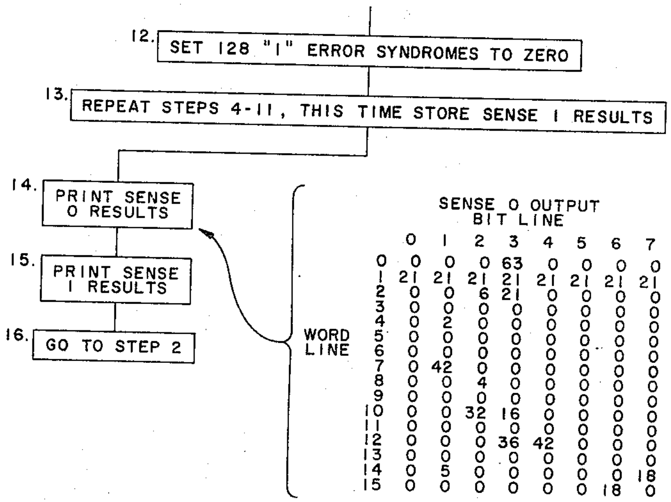
SENSE 0 OUTPUT
BIT LINE
| WORD LINE | 0 | 1 | 2 | 3 | 4 | 5 | 6 | 7 |
|---|---|---|---|---|---|---|---|---|
| 0 | 0 | 0 | 0 | 63 | 0 | 0 | 0 | 0 |
| 1 | 21 | 21 | 21 | 21 | 21 | 21 | 21 | 21 |
| 2 | 0 | 0 | 6 | 21 | 0 | 0 | 0 | 0 |
| 3 | 0 | 0 | 0 | 0 | 0 | 0 | 0 | 0 |
| 4 | 0 | 2 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 42 | 0 | 0 | 0 | 0 | 0 | 0 |
| 8 | 0 | 0 | 4 | 0 | 0 | 0 | 0 | 0 |
| 9 | 0 | 0 | 0 | 0 | 0 | 0 | 0 | 0 |
| 10 | 0 | 0 | 32 | 16 | 0 | 0 | 0 | 0 |
| 11 | 0 | 0 | 0 | 0 | 0 | 0 | 0 | 0 |
| 12 | 0 | 0 | 0 | 36 | 42 | 0 | 0 | 0 |
| 13 | 0 | 0 | 0 | 0 | 0 | 0 | 0 | 0 |
| 14 | 0 | 5 | 0 | 0 | 0 | 0 | 0 | 18 |
| 15 | 0 | 0 | 0 | 0 | 0 | 0 | 18 | 0 |

INVENTOR
CONRAD J. BOISVERT, JR.
BY Amster & Rothstein
Harry M Weiss
ATTORNEYS

| WORD LINE | 0 | 1 | 2 | 3 | 4 | 5 | 6 | 7 |
|---|---|---|---|---|---|---|---|---|
| 0 | 0 | 0 | 0 | 63 | 0 | 0 | 0 | 0 |
| 1 | 21 | 21 | 21 | 21 | 21 | 21 | 21 | 21 |
| 2 | 0 | 0 | 6 | 21 | 0 | 0 | 0 | 0 |
| 3 | 0 | 0 | 0 | 0 | 0 | 0 | 0 | 0 |
| 4 | 0 | 2 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 42 | 0 | 0 | 0 | 0 | 0 | 0 |
| 8 | 0 | 0 | 4 | 0 | 0 | 0 | 0 | 0 |
| 9 | 0 | 0 | 0 | 0 | 0 | 0 | 0 | 0 |
| 10 | 0 | 0 | 32 | 16 | 0 | 0 | 0 | 0 |
| 11 | 0 | 0 | 0 | 0 | 0 | 0 | 0 | 0 |
| 12 | 0 | 0 | 0 | 36 | 42 | 0 | 0 | 0 |
| 13 | 0 | 0 | 0 | 0 | 0 | 0 | 0 | 0 |
| 14 | 0 | 5 | 0 | 0 | 0 | 0 | 0 | 18 |
| 15 | 0 | 0 | 0 | 0 | 0 | 0 | 18 | 0 |

METHOD FOR INDICATING MEMORY CHIP FAILURE MODES

This invention relates to the testing of integrated circuits, and more particularly to a method for indicating memory chip failure modes.

A typical semiconductor integrated circuit memory chip contains a plurality of memory cells and a sufficient number of address lines to enable the selection of a particular cell. For example, in the case of a chip having 128 cells, seven address bits are required to identify any given cell.

It is often found that not all logic circuits on a particular chip are functional. There are a variety of systems commercially available for performing individual tests on the logic circuits of a chip being tested. With the use of such automated equipments it is possible to determine which circuits are not functional. Standard test equipments can generally be programmed so that different test sequences are performed on different types of chips, thus not requiring a separate test system for every type of chip produced.

Various test sequences have been developed for testing memory chips. The cells are tested in particular sequences such that cell interactions, if they exist, are detected. In the prior art, following the testing of a memory chip a print-out in the form of an array of codes has been provided. The array generally corresponds to the physical lay-out of the chip, each entry in the print-out corresponding to a respective cell. The computer used with the tester analyzes the test results and causes a particular code to be printed for each cell to indicate whether it is good or bad. Furthermore, in some systems, in the case of a bad call the particular problem is identified. For example, a map entry such as "MA" may represent a multiple addressing problem with respect to the particular cell.

Unfortunately, such prior art print-outs have been of only limited diagnostic aid because if the computer cannot identify a single problem with a cell (for example, "stuck 0" — a cell which is permanently in the 0 state) the print-out for the cell is a "U" or some other symbol to identify an undefined or unanalyzable cause of failure. In the prior art, the print-out, while it has identified bad cells, has provided an indication of the reason for the failure of any cell to only a limited degree.

Typically, each memory chip is provided with a pair of sense lines. In a typical configuration, when a 0 is sensed in a selected cell the 0 sense line should go high and the 1 sense line should go low. Similarly, when a selected cell contains a 1, the 0 line should go low while the 1 line should go high. In a typical prior art test procedure, the entire test sequence is performed while the tester examines the state of the 0 sense line only. Thereafter, the sequence is performed a second time while the tester examines the signals appearing on the 1 sense line. The tester then combines the information to determine good and bad cells, and particular types of failures, and a single map is printed. I have found, however, that in many cases it is difficult to determine the reason for a cell failure (in the event the computer cannot) if it is not known whether an erroneous signal appeared on the 0 sense line or the 1 sense line when a particular test was failed.

It is a general object of my invention to provide an improved method for indicating memory chip failure modes.

Briefly, in the illustrative embodiment of my invention, a different binary number (1, 2, 4, 8,...) is associated with each test performed on the cells. A pair of "error syndromes" is assigned to each cell. Each error syndrome is a number which is initially zero. Any time a particular cell is tested and the wrong signal appears on the 0 sense line, the 0 error syndrome for that cell is increased in value. The increase is equal to the particular binary number associated with the test which has been failed. Similarly, whenever an erroneous signal appears on the 1 sense line when a particular cell fails a test, the 1 error syndrome for that cell in increased by the binary number associated with the test which has failed.

Following the testing of all cells, two maps are printed. The first map is an array of numbers corresponding to the array of cells; the numbers are the 0 error syndromes. The second map is similar except that the numbers printed out are the 1 error syndromes for the cells. (Although two separate maps are printed in the illustrative embodiment of the invention, in the event no distinction is made between erroneous signals appearing on the 0 and 1 sense lines, only a single error syndrome would be associated with each cell and only a single map would be printed.) Each number on a map corresponds to a unique group of tests which have been failed. For example, if the binary numbers 1, 2, 4, 8... are associated with respective tests A, B, C, D..., and a particular cell has an entry of 9 on a map, it is an indication that the cell failed tests A and D. Because each number on the map corresponds to a unique group of test failures, the map is a powerful diagnostic aid because it pin-points the causes of the test failures. Furthermore, because the print-out is in the form of an array corresponding to the chip topography, similar numbers appearing in rows or columns of the array further aid in the diagnosing of the failure causes.

The method of my invention can be practiced on an automatic tester which is suitable for testing memory chips. A particular tester which can be used is the PAFT II (programmable automatic function tester) manufactured by the Redcor Corporation of Canoga Park, Calif., used in conjunction with Electroglas test probes. The PAFT II tester performs both functional and parametric tests on MOS/LSI devices by generating (under computer control) program-selectable clocks, strobes, input/output patterns, and voltage levels that automatically execute pass/fail tests on a given device under test. Test programs can be generated by any one of the program language processors included in the Redcor standard software package. The PAFT II system includes an RC 70 general purpose digital computer which can be used to control the print-outs.

Figure 2:
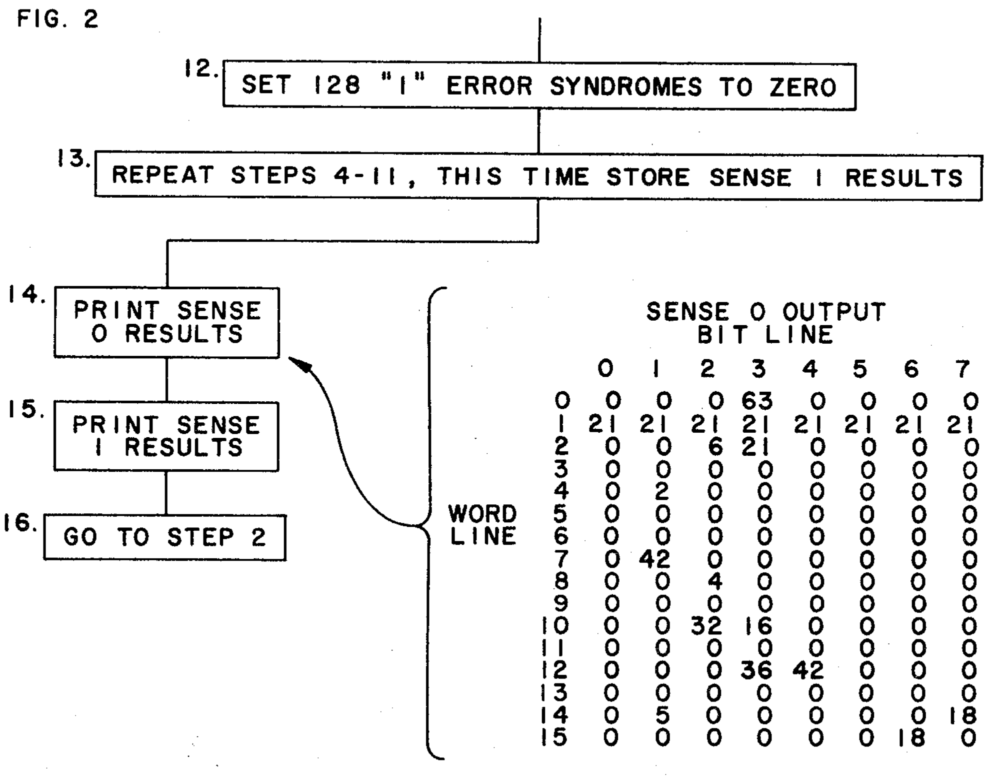

Further objects, features and advantages of my invention will become apparent upon consideration of the following detailed description in conjunction with the drawing, in which:

FIGS. 1 and 2, with the figures being placed one on top of the other, depict a (word) line chart illustrating the steps performed in the illustrative embodiment of my invention. The actual programming of the Redcor RC 70 general purpose digital computer in accordance with the flow chart of the drawing, or the programming of any other chip tester or computer, will be apparent to those skilled in the art.

In the first step of the program, the input test sequences are fed into the computer. The test sequences are of types which have been used in the prior art. The first "test" (W0) consists of the writing of a 0 in each of the 128 cells (in the case of 128-cell chips). The cells are addressed successively in ascending order (0–127). During this first sequence, no bits are read from the cells.

In the second sequence, each cell is operated on as follows: the cell is first read to verify that a 0 was written in it during the first sequence (R0). Then a 1 is written into the cell (W1); the cell is then read to see that the 1 was indeed written in it (R1). At the end of the sequence a 0 is written into the cell (W0). These operations are symbolized by the notation R0, W1, R1, W0. All four operations are performed on each cell before the system advances to test the next cell. The cells are addressed in ascending order. During the third test, the 0 written in each cell at the end of the second sequence is read from the cell (R0), following which a 1 is written into the cell (W1). Again, the cells are operated upon in sequence, in ascending order.

During the fourth test, the 1 previously written in each cell is read (R1), a 0 is written (W0), the cell is then read to verify that a 0 was correctly written (R0), and finally a 1 is written in the cell (W1). During the fourth test sequence, the cells are operated upon in sequence, in descending order (127–0).

Finally, during the fifth test sequence, the 1 previously written in each cell is read (R1), following which a 0 is written into the cell (W0). Once again, the cells are operated upon in descending order.

This type of test sequence not only tests that 0's and 1's are properly written into and read out of cells, it also performs the tests such that if the cells interact with each other to produce erroneous results, the interactions are detected. This will become apparent below.

After the test sequences are fed into the machine (but before they are performed on the cells) a new chip is set up under the test probes. This is shown as step 2 in the flow chart.

An area of the computer memory is then set aside to represent "0" error syndromes. There are 128 "0" error syndrome bits and all of them are initially set in the 0 state. Each chip is often provided with a pair of sense lines. In a typical configuration, when a 0 is sensed in a selected cell the 0 sense line should go high and the 1 sense line should go low. Similarly, when a selected cell contains a 1, the 0 line should go low while the 1 line should go high. During the first half of the testing, only the 0 sense line is examined. When the bit read out of a cell should be a 0, if the 0 sense line goes high the test is passed; if the 0 sense line does not go high the "0" error syndrome memory location for that cell is increased in value to indicate that the cell did not operate properly. Similarly, the "0" error syndrome is increased in value if the 0 sense line goes high when a 1 should be read from the cell. After all five test sequences are performed on each of the 128 cells, 128 "1" error syndrome memory locations are set in the 0 state, as will be described below. During the second performance of all five test sequences, the 1 sense line is examined. Again, if the 1 sense line does not have the proper potential on it when a cell is read, the error syndrome memory location for the cell is increased in value.

Prior to the examination of the 0 sense line during the first performance of the five test sequences on each cell, all 128 "0" error syndromes are set to 0. In the fourth step of the program, the first and second test sequences are performed on all of the cells. The computer stores the sense 0 results, that is, it temporarily stores information indicative of whether or not the sense 0 line was of the proper polarity during each of the two read operations performed on each cell. In step 5 of the program, 1 is added to the respective error syndrome for any cell which failed the R0 test, and 2 is added to it if the R1 test was failed. In step 6, the third test sequence is performed and the sense 0 results are temporarily stored. In step 7, the error syndrome for each cell is increased by 4 if the 0 sense line did not go low when the state of the cell was last sensed.

In step 8, the fourth test sequence is performed and the sense 0 results are temporarily stored; in step 9, the error syndrome for any cell is increased by 8 if the 0 sense line was of the wrong polarity during the R1 test in step 8, and the error syndrome is increased by 16 if the 0 sense line was of the wrong polarity during the R0 test in step 8.

Finally, in the 10th and 11th steps, the fifth test sequence is performed and if the R1 test fails on any cell, the error syndrome for that cell is increased by 32.

After all of the cells have been tested in this manner by examining the 0 sense line, in step 12 the 128 "1" error syndromes are set to 0. In step 13, steps 4–11 are repeated; but this time the 1 sense line is examined each time a read operation is performed. Any time the polarity on the 1 sense line is improper, the "1" error syndrome for the cell being sensed is increased in value by an increment of 1, 2, 4, 8, 16 or 32.

In step 14, the values of the 0 error syndromes are printed. The form of a typical print-out is shown adjacent to the box representing step 14. The array corresponds to the chip topography — it has eight bit lines and 16 word lines. The number in the array for each cell on the chip is the final 0 error syndrome — any one of the values 0 through 63.

In step 15, a similar map is printed for the 1 error syndromes. Thereafter, the system proceeds to step 2 and the testing of another chip.

Before the value of the error syndromes in the maps as a diagnostic aid can be appreciated, it is necessary to analyze the several well-defined failure modes for monolithic memory devices. The following list describes them:

1. Stuck Cell — A selected memory cell (bit) cannot be switched from its stuck state. A cell can be stuck in either the 1 state (S1) or the 0 state (S0).
2. Multiple Addressing (MA) — More than one cell is selected by a particular address.
3. Write 1 disturbs 1 (W1D1) — Writing a 1 in one cell switches a 1 in another cell to a 0.
4. Write 1 disturbs 0 (W1D0) — Writing a 1 in one cell switches a 0 in another cell to a 1.
5. Write 0 disturbs 1 (W0D1) — Writing a 0 in one cell switches a 1 in another cell to a 0.
6. Write 0 disturbs 0 (W0D0) — Writing a 0 in one cell switches a 0 in another cell to a 1.
7. Read 1 disturbs 1 (R1D1) — Reading a 1 from one cell switches a 1 in another cell to a 0.
8. Read 1 disturbs 0 (R1D0) — Reading a 1 from one cell switches a 0 in another cell to a 1.
9. Read 0 disturbs 1 (R0D1) — Reading a 0 from one cell switches a 1 in another cell to a 0.
10. Read 0 disturbs 0 (R0D0) — Reading a 0 from one cell switches a 0 in another cell to a 1.
11. Slow Bit Recovery (Recovery) — A read operation following a write operation (on the same cell) fails.
12. Slow Access Time (Access) — The response of the device to a read operation is too slow.

The relative frequencies of occurrence of the various failure modes necessarily vary from chip type to chip type. In at least one case, the relative frequencies of occurrence of the various failure modes were as follows:

| Failure Mode | % Of All Failures |
|---|---|
| Stucks | 50% |
| Multiple Addressing | 20% |
| Disturbs | 5% |
| Recovery, Access | 1% |
| Combinations | 24% |

By "combinations" is means combinations of the other types of failure modes. It is expected that the data in the above table is representative of monolithic memory devices in general.

The test sequences include six read operations at each memory address. It is to these read operations (tests) that the binary numbers are assigned. The two read operations in step 2 of the test sequence (R0 and R1) have assigned to them the numbers 1 and 2. Test R0 in step 3 has assigned to it the binary number 4. In step 4, the two read operations R1 and R0 have assigned to them the binary numbers 8 and 16. In step 5, the number 32 is assigned to the single read operation (R1). If a cell fails no tests, its final error syndrome is zero and if it fails all six tests its error syndrome is 63. If it fails any combination of the six tests (for example, the second and third read tests, or the first, fourth and fifth read tests, etc.) its error syndrome uniquely identifies which of the six tests have been failed.

The following Table indicates the six read operations (in terms of their binary weights) and the possible failure modes of a particular cell which could cause each test to fail. In the Table two special symbols are used. The symbol (<) means that a lower-address cell affects the contents of a higher-address cell and causes a test failure when the higher-address cell is operated upon, while the symbol (>) means that an operation on a higher-address cell affects the contents of a lower-address cell and causes a test failure when the lower-address cell is operated upon. For example, the code W1D0 (>) means that when a 1 is written in a higher-address cell, it erroneously results in the switching of a 0 in a lower-address cell to a 1.

| Read Sequence Number | Binary Weight | Possible failure Modes |
|---|---|---|
| 1 | 1 | S1, W1D0 (<), W0D0 (<), R1D0 (<), R0D0 (<), W0D0 (>) |
| 2 | 2 | S0, Recovery |
| 3 | 4 | S1, MA (<), W1D0 (<), R0D0 (>), W1D0 (>), R1D0 (>), W0D0 (>) |

| | | |
|---|---|---|
| 4 | 8 | S0, R0D1 (>), W1D1 (>), R1D1 (>), W0D1 (>) |
| 5 | 16 | S1, Recovery |
| 6 | 32 | S0, MA (>), R1D1 (<), W0D1 (<), R0D1 (<), W1D1 (<), R1D1 (>), W0D1 (>) |

It is important at this stage to understand how each of the possible failure modes results in the failures of the tests indicated in the Table. When the first R0 read test is performed on any cell, if the cell is stuck in the 1 state it is apparent that the test will be failed. For this reason, the Table indicates that an S1 failure mode results in the addition of unity to the respective error syndrome.

During the first test sequence, a 0 is written in each of the 128 cells. During the second test sequence, each cell is operated upon and during the course of the operations on the cell a 1 is written into it. If the writing of this 1 bit disturbs the 0 previously written in some other cell with a higher address, then when this cell with a higher address is first read when the second test sequence is performed on it, instead of a 0 being read, a 1 will be read. It is for this reason that the entry W1D0 (<) is included in the first row of the Table — when the higher address cell is first read during the second test sequence, if the writing of a 1 in a lower address cell also caused a 1 to be written in the higher address cell, the first R0 test will be failed. Similarly, the other three operations performed on each cell during the second test sequence are R0, R 1 and W0. If any of these three operations on a lower address cell disturbs the 0 in a higher address cell, then when the higher address cell is first sensed when the second test sequence is performed on it, a 1 will be read rather than a 0. It is for this reason that the three entries W0D0 (<), R1D0 (<) and R0D0 (<) are included in the first row of the Table.

The W0D0 (>) entry is included for another reason. When the first test sequence (W0) is performed on all of the cells as they are addressed in ascending order, 0's are written into them. If the writing of a 0 in a higher address cell causes a 1 to be written in a lower address cell (after that lower address cell has been set in the 0 state), then when the lower address cell is first read during the second test sequence a 0 will not be sensed as it should be. This is an indication that the writing of a 0 in a higher address cell disturbed a 0 in a lower address cell — a failure mode of the type W0D0 (>).

All of the entries in the first row of the Table result from the failure of the R0 test during the second sequence on each cell; the reading of a 1 in any cell instead of a 0 at the beginning of the second test sequence on that cell can result from any one of the six failure modes listed in the Table.

The binary weight 2 is associated with the R1 operation in the second test sequence. If any cell is stuck in the 0 state, then during the R1 operation a 0 will be sensed rather than a 1. It is for this reason that the S0 entry is made in the second line of the Table. It should also be noted that in the second test sequence when each cell is operated upon a 1 is written into it and is then read out immediately. If there is a recovery problem with the cell, the 1 bit will not be sensed. It is for this reason that the "recovery" entry is made in the second line of the Table.

During the third test sequence, the state of each cell is first sensed to see if it is a 0. Thus during the R0 operation in the third test sequence, a 0 should be sensed. If it is not, it may be that the cell is stuck in the 1 state; thus, the S1 failure mode is associated with the binary weight 4.

The second operation performed on each cell during the third test sequence is the writing of a 1. The cells are operated upon in ascending order. If the writing of a 1 in a lower address call also causes a 1 to be written in a higher address call, then when this higher address cell is first read a 1 will be sensed rather than the 0 which should be. This situation arises because the addressing of a lower number cell causes both that cell and the higher number cell to be selected, a failure mode of MA (<). When the higher number cell is operated upon, an error is detected and the error syndrome for this higher number cell is increased by a value of 4.

It should be noted that even though the second test sequence also includes an R0, W1 operation combination, multiple addressing failure modes cannot be detected. This is due to the fact that at the end of the second test sequence on each cell, a 0 is once again written into it. Consequently, even if there is a multiple addressing problem, while during the W1 operation in the second test sequence a higher number cell can be erroneously set in the 1 state, when a 0 is written in the same lower number cell it will also be written in the higher number cell as well and the error will in effect be erased. An MA (<) failure mode is detected only during the third read operation.

At the end of the third test sequence on any cell, when a 1 is written into it, it may disturb the 0 in a cell of a higher address. When this cell with the higher address is first read, a 1 will be sensed rather than a O — a W1D0 (<) failure mode as indicated in the Table.

There are four other failure modes which may result in the sensing of a 1 bit during the R0 operation in the third test sequence on any cell. The second test sequence is performed on all cells in ascending order. At the end of each test sequence a 0 is written into the cell being operated upon. It is possible that any one of the four operations in the second test sequence on any higher address cell will erroneously cause a 1 to be written in a lower address cell. This will result in the failure of the R0 test in the third test sequence when the lower address cell is tested. It is for this reason that the third line in the Table includes the four entries R0D0 (>), W1D0 (>), R1D0 (>) and W0D0 (>).

At the end of the third test sequence on each cell, a 1 is written in it. Therefore, at the start of the fourth test sequence each cell should be in the 1 state. If the R1 operation at the start of the fourth test sequence on any cell results in the reading of a 0, it may be an indication that the cell is stuck in the 0 state. For this reason a stuck 0 (S0) cell has its error syndrome increased by 8 during the fourth test sequence, as shown in the fourth line of the Table.

The fourth test sequence is performed on the cells in decreasing order. If any one of the four operations performed on a higher address cell disturbs the 1 in a lower address cell, then when the lower address cell is operated upon the R1 test in the fourth test sequence will be failed. Therefore, the R1 test may fail during the fourth test sequence as a result of any one of the R0D1 (>), W1D1 (>), R1D1 (>) and W0D1 (>) failure modes as indicated in the Table.

If the R0 test in the fourth test sequence fails for any cell, it may be due to either one of two causes. Perhaps the cell is stuck in the 1 state (S1), or perhaps a read operation on the cell cannot immediately follow a write operation on it (during the fourth test sequence on each cell, the R0 operation immediately follows the W0 operation). These two possibilities are indicated in the fifth line of the Table.

A failure of the R1 test during the fifth test sequence on any cell can have one of eight distinct causes. Of course, the cell may be stuck in the 0 state, and for this reason the sixth line in the Table includes an S0 entry. There may also be a multiple addressing problem similar to the type detected during the third test sequence on any cell. However, because the cells are operated upon in descending order during the fifth test sequence, as opposed to the ascending order of the third test sequence, the multiple addressing entry in the sixth line of the Table is MA (>) rather than MA (<) — the writing of a 0 at the end of the fifth test sequence on any cell, if it also results in the writing of a 0 in a lower address cell, means that the lower address cell is erroneously selected along with a higher address cell.

At the end of the fourth test sequence on any cell a 1 is written in it. The system then proceeds to operate on lower address cells since the fourth test sequence is performed on the cells in descending order. If any one of the four operations on a lower address cell disturbs the 1 previously written in a higher address cell, then when the higher address cell is first read during the fifth test sequence, a 0 will be read rather than the 1 which should be read. The erroneous reading may be an indication of a failure in any one of the modes R1D1 (<), W0D1 (<), R0D1 (<) or W1D1 (<), as indicated in the sixth line of the Table.

There are two additional failure modes which may be detected during the fifth test sequence on any cell. At the end of the fourth test sequence, a 1 is written into each cell. During the fifth test sequence, the cells are operated upon in descending order. If the R1 or the W0 operation on any cell disturbs a 1 in a lower address cell, then the R1 test in the fifth test sequence will be failed when the lower address cell is operated upon. For this reason the sixth line of the Table includes the two additional entries R1D1 (>) and W0D1 (>).

Error syndromes are printed out in the form of chip maps. There are two maps for each chip; one for the tests performed on the sense 0 output and one for the tests performed on the sense 1 output. (FIG. 2 depicts a typical chip map for the sense 0 output.) Each chip map contains 128 entries, one for each cell on a 128-cell chip. Each entry represents the error syndrome for a respective cell. Thus the maps represent a graphic print-out of the test results and may be used to diagnose the chip.

Cell failures can be classified in three types:

1. Cell failures which are distinct from other cell failures.
2. Cell failures which are common in groups but which do not occur on the entire chip.
3. Cell failures which exist on the entire chip. The analysis of the chip map should be made in terms of these three failure classifications.

An individual (isolated) cell failure can be caused by one of two conditions — a defect within the cell or an interaction with some other cell in the array. In either case, the failure mode can be diagnosed from the error syndrome for the cell. Consider, for example, a stuck 0 cell. Referring to the Table above which depicts the possible failure modes for each binary weight, it is seen that an S0 entry is associated with binary weights 2, 8 and 32. During the second, fourth and sixth test sequences, when the cell is tested the R1 test will be failed and the error syndrome will be increased. If the number 42 is printed out on the chip map, it is an indication that the respective cell is stuck in the 0 state. This is shown in FIG. 2 for two cells — the cell in word line 7 and bit line 1, and the cell in word line 12 and bit line 4.

A cell stuck in the 1 state results in a test failure during the first, third and fifth read operations. During each of the respective test sequences, the error syndrome for the cell is increased by 1, 4 and 16. Consequently, the printout of the number 21 on the chip map represents a cell stuck in the 1 state, as shown for the cell in word line 2 and bit line 3. (The complete row of 21's in word line 1 represents a group failure and will be described below.)

Referring to the failure mode Table, it will be noted that a recovery problem can cause the error syndrome for a cell to be increased by either 2 (following the second read operation) or 16 (following the fifth read operation). The binary number 2 is added to the error syndrome if a 1 cannot be read from a cell immediately after it is written, and the binary number 16 is added to the error syndrome if a 0 cannot be read from a cell immediately after it is written. It is possible for a particular cell to fail in either one or both of the two possible modes. In FIG. 2, the cell in word line 4 and bit line 1 is shown as having failed to recover during the second test sequence (an error syndrome of 2), the cell in word line 10 and bit line 3 is shown to have failed to recover during the fourth test sequence (an error syndrome of 16), and the cells in word line 14 and bit line 7, and word line 15 and bit line 6, are shown to have failed to recover during both test sequences (error syndromes of 18).

Referring to the Table, the multiple addressing binary weights are 4 and 32 — 4 for the MA (<) failure mode and 32 for the MA (>) failure mode. A cell may be improperly selected when a lower number cell is addressed, or when a higher number cell is addressed, or both. Thus it is possible for the error syndrome for a cell which fails only in the multiple addressing mode to be 4, 32 or 36. The three respective error syndromes are shown in FIG. 2 for the cells in word line 8 and bit line 2, word line 10 and bit line 2, and word line 12 and bit line 3.

There are six different error syndrome values for the various types of disturb failure modes. The error syndrome for each particular disturb failure mode is determined by adding up the binary weights associated with that failure mode. For example, the W1D0 (<) failure mode results in additions to the error syndrome for a cell of 1 and 4. Thus an error syndrome of 5 on the chip map represents a W1D0 (<) failure mode. By adding up the binary weights associated with each of the disturb failure modes, the following disturb error syndromes are derived (since there are eight possible disturb failure modes, as described above, and each disturb failure mode may result from an operation performed on a higher address cell or a lower address cell, there are 16 possibilities in all):

| Disturb Failure Mode | Error Syndrome |
|---|---|
| W1D0 (<) | 1+4 = 5 |
| W0D0 (<) | 1 |
| R1D0 (<) | 1 |
| R0D0 (<) | 1 |
| W0D0 (>) | 1+4 = 5 |
| R0D0 (>) | 4 |
| W1D0 (>) | 4 |
| R1D0 (>) | 4 |
| R0D1 (>) | 8 |
| W1D1 (>) | 8 |
| R1D1 (>) | 8+32 = 40 |
| W0D1 (>) | 8+32 = 40 |
| R1D1 (<) | 32 |
| W0D1 (<) | 32 |
| R0D1 (<) | 32 |
| W1D1 (<) | 32 |

Thus, there are six possible error syndromes for cells whose states are disturbed by operations performed on other cells — 1, 4, 5, 8, 32 and 40. Only one such error syndrome is shown in FIG. 2 — The number 5 for the cell in word line 14 and bit line 1.

Another possible individual cell failure mode is that of "DC level." It is sometimes found that the DC levels produced on the 0 and/or 1 sense line by a particular cell may be incorrect for all bit values — in which case all six of the tests are failed. In such a case, the error syndrome for the cell is 63, as shown for the cell in word line 0 and bit line 3 on the chip map in FIG. 2. (If the error syndrome of 63 appears on only one of the maps, it is an indication that the respective cell fails to produce proper DC levels on only one of the two sense outputs.)

The following Table summarizes the most common failure modes associated with individual cells:

| Failure Mode | Syndrome(s) |
|---|---|
| Stuck "0" | **42** |
| Stuck "1" | **21** |
| Bit Recovery | 2, 16, 18 |
| Multiple Addressing | 4, 32, 36 |
| Disturbs | 1, 4, 5, 8, 32, 40 |
| DC Level | 63 |

Other error syndromes may be applicable to single cell failures. For example, if a cell operates correctly only intermittently, then the various tests will be failed on a random basis and its error syndrome will not be one of the well defined syndromes associated with the six failure modes listed in the Table immediately above. Other error syndromes can be produced in the case of marginal operation or even oscillating cells. Furthermore, it is possible for a particular cell to fail in two or more modes in which case the error syndrome would be the sum of two or more of the error syndromes listed in the Table. However, the table is of considerable value because a majority of individual cell failures (as opposed to group and entire chip failures) produce the syndrome numbers listed in the Table and the causes of the cell failures can be readily ascertained.

There are several different types of group failures and they are generally attributable to erroneous operations of the word drivers or the bit drivers/sense amplifiers on the chip. (In the case of 128-cell chips having a physical cell lay-out represented by the chip map in FIG. 2, there are 16 word drivers and eight bit drivers/sense amplifiers.)

The following Table illustrates the most common group failure modes together with their syndromes:

| Failure Mode | Syndrome(s) | |
|---|---|---|
| Unselected word driver | 21 (sense **0** map)<br>42 (sense **1** map) | (row) |
| Multiple row select | 4, 32, 36 | (row) |
| Unselected sense amplifier | 21 (sense **0** map)<br>42 (sense **1** map) | (column) |
| Multiple column select | 4, 32, 36 | (column) |
| Stuck "0" sense amplifier | 21 | (column) |
| Stuck "1" sense amplifier | 42 | (column) |
| Unselected bit driver | Irregular pattern of 21 and 42 | (column) |

In order to select a cell for reading or writing, it is necessary to drive the row (word) line containing the cell to be operated upon. If a word driver is not functional, the respective word line cannot be pulsed and consequently nothing can be written into or read out of the cells in the respective row. When each cell in the row is tested by examining the 0 sense line, when a 0 is expected in the cell the 0 sense line should go high. If the word driver is not functional, the 0 sense line cannot go high. Each cell in the row then appears to be stuck in the 1 state. Therefore an entire word line on the sense 0 chip map includes entries of 21. When the same cells are tested by examining the 1 sense line, whenever a 1 should be read from a cell the 1 line should go high. Since it cannot go high, it appears that the cell is stuck in the 0 state (that is, the binary weights of the tests which are failed add up to 42). Consequently, the same word line on the sense 1 chip map contains entries of 42. As indicated in the first line of the Failure Mode — Syndrome(s) Table above, if any word driver cannot be selected, the respective row on the sense 0 map contains eight 21's and the same row on the sense 1 map contains eight 42's. It should be noted that if both maps contain total line entries of 21 (or 42), it is an indication that all cells in the row are stuck in the 1 (or 0) state, while if the rows of the maps contain the different entries it is an indication that a word driver cannot be selected.

It is possible that the selection of one word driver also causes another word driver to be selected at the same time. For example, suppose that when word driver 5 is selected, word driver 3 is selected as well. This means that when the cell in the fifth row and first column is selected, so is the cell in the third row and first column; when the cell in the fifth row and second column is selected, so is the cell in the third row and second column; etc. Every time that a cell is selected in the fifth row, a corresponding cell is selected in the third row. Thus, there is a multiple addressing problem with every cell in the third row. The multiple addressing syndromes are, as described above, 4, 32, and 36. If an entire row on both chip maps contains entries of 32, for example, it is conceivable that each cell in the row has an individual multiple addressing problem. It is much more likely, however, that the problem is with the selection of the respective word driver; if any row on both chip maps contains all 4's, all 32's, or all 36's, it is most likely that the associated word driver is being incorrectly selected when another word driver is addressed.

The third failure mode indicated in the Table is that of "unselected sense amplifier." If any sense amplifier cannot be selected, that is, it is inoperative, then erroneous readings will result when all cells in the respective column are examined. This situation is precisely the same as that of "unselected word driver" except that the cells which fail are those contained in a column rather than a row. In such a case, a column of cells on the sense 0 chip map contains entries of 21, while the same numbered column on the sense 1 map contains entries of 42.

The "multiple column select" failure mode is comparable to the "multiple row select" failure mode except that in this case it is the addressing of the bit driver or sense amplifier associated with one bit line that also causes the bit driver or sense amplifier associated with another bit line to be selected. There results on each map column entries of 4, 32, or 36. If, for example, column 5 on each map contains only 32's, it is most likely that there is a group failure, rather than individual failures of each cell in the column.

It is also possible for a sense amplifier to be stuck in the 0 state; this means that the sense amplifier always functions to indicate that a 0 has been read from a cell. In effect, the sense amplifier indicates that every cell in the respective column is stuck in the 0 state. Thus, as indicated in the Table, there results a column of 42's on both maps. Similarly, if any sense amplifier provides an output indicative of only a 1 bit value, then both maps will exhibit a column of 21's.

Finally, it is possible that a particular bit driver cannot be selected at all. This means that it is impossible to write bits in the cells in the respective column. Initially, when power is first supplied to the system the cells assume arbitrary 0 and 1 values. If a bit driver is inoperative, it means that the values of the bits stored in a column of cells cannot be changed from their initial random values. If the sense amplifier is still operative, when the cells are read, some of them will appear to be stuck in the 0 state and others will appear to be stuck in the 1 state. Thus if an entire column on both maps consists of 21 and 42 entries (the same entries in corresponding positions on both maps), it is an indication of a group failure involving a bit driver which cannot be selected or operated.

Several important gross failures of an entire chip can also be diagnosed from the error syndromes. They are defined in the following Table:

| Failure Mode | Syndrome(s) |
|---|---|
| Input address line open or shorted | 4, 32 alternately indicated |
| Input select line open | 21 (sense **0** map)<br>42 (sense **1** map) |
| Input R/W line always on read | Irregular pattern of 21 and 42 |
| Sense 0 output line open | 21 (sense **0** map)<br>0 (sense **1** map) |
| Sense 1 output line open | 0 (sense **0** map)<br>42 (sense **1** map) |
| Input DATA line open or shorted | 21 or 42 |

During every test sequence, the cells are addressed in either ascending or descending order. If one of the address lines is open or shorted, it means that the bit value which it represents is always a 0 or always a 1. In effect, only half of all the cells can be selected; and during each test sequence, since the other address lines are cycled twice, each of the 64 cells which is selected is selected twice. Suppose that the test sequence is being performed on the cells in ascending order. Consider a particular one of the 64 cells which can be selected. When this cell is first "properly" selected suppose it passes the test. As the system continues to test the cells, eventually some higher number cell will be addressed, but because one of the address lines does not function properly, instead of the system actually operating on the higher number cell what it does is to operate a second time on the lower number cell. (In this case, what is meant by higher and lower number cells are the cell addresses defined by only the remaining operative address lines.) And an erroneous reading results since the lower number cell has already been operated upon. Since the system "thinks" that it is operating on the higher number cell, it "assumes" that the higher number cell was improperly selected along with the lower number cell when the lower number cell was operated upon. This is treated as one type of multiple addressing problem. However, when the other test sequences are performed in descending order on the cells, it is the lower number cells which appear to have been improperly addressed when higher number cells were operated upon — the second type of multiple addressing problem. Thus, even though only 64 of the cells are operated upon, all of the cells appear to have a multiple addressing problem; half of them appear to be improperly selected when higher number cells are operated upon and the other half appear to be improperly selected when lower number cells are operated upon. This results in the syndrome numbers 4 and 32 being alternately indicated on both maps (the same entry appears for each cell on both maps).

The second gross failure is that of an open input select line. In most semiconductor memory systems, a particular chip can be operated upon only if its select line is pulsed. If the select line is open, then no operations can be performed on the chip. This is equivalent to all of the word drivers and all of the sense amplifiers being unselected. Referring to the group Failure Mode — Syndrome(s) Table, it will be recalled that in the case of an "unselected word driver" the respective row contains entries of 21 on the sense 0 map and the respective row contains entries of 42 on the sense 1 map, while in the case of an "unselected sense amplifier" the same kinds of entries appear in columns. If the input select line is open, since in effect none of the word drivers and none of the sense amplifiers can be selected, the sense 0 map contains no entries other than 21 and the sense 1 map contains no entries other than 42.

In a typical semiconductor memory, a read/write line is extended to each chip; depending upon the polarity of the R/W signal, a read operation is performed on a selected cell or a write operation is performed on it. If the R/W line is inoperative to always indicate a read operation, the bit values in the cells cannot be changed. When power is first supplied to the system, the cells assume random states and they remain stuck in these states throughout the test sequences. This is equivalent to the case of "unselected bit driver" in the group Failure Mode — Syndrome(s) Table; in the case of an input R/W line always on read, in effect none of the bit drivers operate since nothing can be written into a cell. Instead of having an irregular pattern of 21's and 42's in only one column (on each chip map) as in the case of a group failure, both chip maps contain irregular patterns of 21's and 42's in all 128 positions.

It is also possible that all of the cells on a chip are operative, but the sense 0 output line is open. In such a case, during that half of the overall sequence when the sense 0 line is examined, wherever the 0 sense line should go high to indicate that a cell contains a 0, the line will not go high. Thus to the tester it appears that every cell is stuck in the 1 state. Consequently, all 128 positions on the sense 0 map contain 21's. But assuming that the sense 1 output line functions properly, when the entire test sequence is performed while examining the sense 1 line, no false readings are observed; consequently, unless there are individual cell failures, every entry on the sense 1 map is a 0.

On the other hand, suppose that the sense 1 output line is open. In this case, when all of the test sequences are performed while examining the sense 0 line, unless some of the cells are inoperative, it appears that they all function properly; the sense 0 map contains 128 entries of 0. On the other hand, whenever the 1 output line should go high to indicate the storage of a 1 in a cell, it does not go high. It therefore appears that all of the cells are stuck in the 0 state, and consequently the sense 1 map contains 128 entries each of which is 42.

Finally, it is possible for the input data line to be open or shorted, that is, even though 0's and 1's should be written in the various cells in accordance with the test sequences, only 0's or only 1's are written in a selected cell every time a write operation is performed. Since only one bit value can be written into every cell, this bit value is always read out and it appears that all of the cells are stuck in the 0 state or the 1 state. Consequently, both maps contain 128 entries of 21, or 128 entries of 42.

Other error syndromes may be applicable to group and gross failures. However, the Tables above are of considerable value because a majority of group and gross failures produce the number patterns listed in the Table and the causes of the failures can be readily ascertained.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. A machine-practiced method for indicating memory chip failure modes comprising the steps of:
1. performing a series of electronic tests on each of the cells on a chip,
2. assigning different binary numbers to each of said tests,
3. forming an error syndrome number for each cell which is the sum of the binary numbers assigned to each of the tests failed by the cell, and
4. providing a record of the error syndrome numbers for all cells.

2. A machine-practiced method for indicating memory chip failure modes in accordance with claim 1 wherein in step (4) the error syndrome numbers are printed on a chip map having a format corresponding to the physical lay-out of the cells on the chip.

3. A machine-practiced method for indicating memory chip failure modes in accordance with claim 1 wherein the chip includes a 0 sense line and a 1 sense line and a cell is tested by examining the signal on one of the 0 and 1 sense lines, steps (1) and (3) are performed twice for each cell with an error syndrome number being formed in step (3) for each of the 0 and 1 sense lines when each cell is tested, and in step (4) two chip maps are printed each containing the error syndrome numbers associated with respective cells when respective 0 and 1 sense lines are examined and each having a format corresponding to the physical lay-out of the cells on the chip.

4. A method for determining probable memory chip failure modes comprising the steps of:
1. utilizing an automatic tester to perform a series of electronic tests on each of the cells on a chip,
2. assigning different binary numbers to each of said tests,
3. causing said automatic tester to form an error syndrome number for each cell which is the sum of the binary numbers assigned to each of the tests failed by the cell,
4. causing said automatic tester to provide a record of the error syndrome numbers for all cells, and
5. identifying probable chip failure modes from the record of error syndrome numbers.

5. A method for determining probable memory chip failure modes in accordance with claim 4 wherein in step (4) the error syndrome numbers are printed on a chip map having a format corresponding to the physical lay-out of the cells on the chip.

6. A method for determining probable memory chip failure modes in accordance with claim 4 wherein the chip includes a 0 sense line and a 1 sense line and a cell is tested by examining the signal on one of the 0 and 1 sense lines, steps (1) and (3) are performed twice for each cell with an error syndrome number being formed in step (3) for each of the 0 and 1 sense lines when each cell is tested, and in step (4) two chip maps are printed each containing the error syndrome numbers associated with respective cells when respective 0 and 1 sense lines are examined and each having a format corresponding to the physical lay-out of the cells on the chip.

7. A machine-practical method for indicating probable memory chip failure modes comprising the steps of:
1. electronically testing each of the cells on a chip,
2. assigning different numbers to each of the tests performed on the cells,
3. forming an error syndrome number for each cell which is a function of the numbers assigned to each of the tests failed by the cell such that every combination of test failures results in the formation of a unique error syndrome number, and
4. providing a record of the error syndrome numbers for all cells.

8. A machine-practiced method for indicating probable memory chip failure modes in accordance with claim 7 wherein in step (4) the error syndrome numbers are printed on a chip may having a format corresponding to the physical lay-out of the cells on the chip.

9. A machine-practiced method for indicating probable memory chip failure modes in accordance with claim 7 wherein the chip includes a 0 sense line and a 1 sense line and a cell is tested by examining the signal on one of the 0 and 1 sense lines, steps (1) and (3) are performed twice for each cell with an error syndrome number being formed in step (3) for each of the 0 and 1 sense lines when each cell is tested, and in step (4) two chip maps are printed each containing the error syndrome numbers associated with respective cells when respective 0 and 1 sense lines are examined and each having a format corresponding to the physical lay-out of the cells on the chip.

10. A machine-practiced method for indicating probable memory chip failure modes comprising the steps of:

1. electronically testing each of the cells on a chip,
2. assigning different numbers to each of the tests performed on the cells, and
3. forming an error syndrome number for each cell which is a function of the numbers assigned to each of the tests failed by the cell such that every combination of test failures results in the formation of a unique error syndrome number.

11. A machine-practiced method for indicating probable memory chip failure modes in accordance with claim 10 further including the step of printing the error syndrome numbers on a chip map having a format corresponding to the physical lay-out of the cells on the chip.

12. A machine-practiced method for indicating probable memory chip failure modes in accordance with claim 10 wherein the chip includes a 0 sense line and a 1 sense line and a cell is tested by examining the signal on one of the 0 and 1 sense lines, steps (1) and (3) are performed twice for each cell with an error syndrome number being formed in step (3) for each of the 0 and 1 sense lines when each cell is tested, and further including the step of printing two chip maps each containing the error syndrome numbers associated with respective cells when respective 0 and 1 sense lines are examined and each having a format corresponding to the physical layout of the cells on the chip.

13. A machine-practiced method for indicating probable chip failure modes comprising the steps of:

1. electronically testing each of a plurality of circuits on a chip,
2. assigning different numbers to each of the tests performed on the circuits, and
3. forming an error syndrome number for each circuit which is a function of the numbers assigned to each of the tests failed by the circuit such that every combination of tests failures results in the formation of a unique error syndrome number.

14. A machine-practiced method for indicating probable chip failure modes in accordance with claim 13 further including the step of printing the error syndrome numbers on a chip map having a format corresponding to the physical lay-out of the circuits on the chip.

15. A method for aiding the diagnosis of chip failure modes for a chip having a plurality of circuits on which a number of electronic tests have been performed comprising the step of:

forming an error syndrome symbol for at least one of said circuits which is a function of the tests failed by the circuit such that every combination of test failures results in the formation of a unique error syndrome symbol.

16. A method for aiding the diagnosis of a circuit failure mode for a circuit having failed a number of electronic tests comprising the step of:

deriving an error syndrome symbol for the circuit which is a function of the tests failed by the circuit such that every combination of test failures results in the formation of a unique error syndrome symbol.

17. A method for aiding in the diagnosis of a circuit failure mode comprising the steps of:

1. performing a plurality of electronic tests on the circuit, and,
2. deriving an error syndrome symbol for the circuit which is a function of the tests failed by the circuit such that every combination of test failures results in the formation of a unique error syndrome symbol.

18. A machine-practiced method for aiding in the diagnosis of a circuit failure mode comprising the steps of:

1. performing a plurality of electronic tests on the circuit,
2. assigning different numbers to each of the tests performed on the circuit, and,
3. forming an error syndrome number for the circuit which is a function of the numbers assigned to each of the tests failed by the circuit such that every combination of test failures results in the formation of a unique error syndrome number.

* * * * *